US011972023B2

(12) United States Patent
Miettinen et al.

(10) Patent No.: US 11,972,023 B2
(45) Date of Patent: Apr. 30, 2024

(54) COMPATIBLE ANONYMIZATION OF DATA SETS OF DIFFERENT SOURCES

(71) Applicant: University of Helsinki, Helsingin Yliopisto (FI)

(72) Inventors: Timo A. Miettinen, Helsingin Yliopisto (FI); Janna Saarela, Helsingin Yliopisto (FI); Teemu J. Perheentupa, Helsingin Yliopisto (FI); Robert Mills, Helsingin Yliopisto (FI); Mehreen Ali, Helsingin Yliopisto (FI); Tuomo Pentikäinen, Helsingin Yliopisto (FI)

(73) Assignee: University of Helsinki, Helsingin Yliopisto (FI)

( * ) Notice: Subject to any disclaimer, the term of this patent is extended or adjusted under 35 U.S.C. 154(b) by 294 days.

(21) Appl. No.: 17/611,969

(22) PCT Filed: May 20, 2020

(86) PCT No.: PCT/FI2020/050342
§ 371 (c)(1),
(2) Date: Nov. 17, 2021

(87) PCT Pub. No.: WO2020/234515
PCT Pub. Date: Nov. 26, 2020

(65) Prior Publication Data
US 2022/0237323 A1    Jul. 28, 2022

(30) Foreign Application Priority Data
May 23, 2019   (FI) ..................... 20195426

(51) Int. Cl.
*G06F 21/62*    (2013.01)
(52) U.S. Cl.
CPC ............... *G06F 21/6254* (2013.01)

(58) Field of Classification Search
CPC . G06F 21/6254; G06F 21/6245; G06N 20/00; G06N 3/08
See application file for complete search history.

(56) References Cited

U.S. PATENT DOCUMENTS

2013/0291128 A1* 10/2013 Ito .................. G06F 21/6254
726/30
2017/0243028 A1  8/2017 LaFever et al.
(Continued)

FOREIGN PATENT DOCUMENTS

EP    2228735 A2    9/2010
EP    3451209 A1    3/2019
(Continued)

OTHER PUBLICATIONS

Jordon J, Yoon J, Van Der Schaar M. Pate-Gan: Generating synthetic data with differential privacy guarantees. In International conference on learning representations Sep. 27, 2018. (Year: 2018).*
(Continued)

*Primary Examiner* — Robert B Leung
(74) *Attorney, Agent, or Firm* — Ziegler IP Law Group

(57) ABSTRACT

Creating compatible anonymized data sets by performing with machine learning equipment that operates a machine learning model by defining data types of variables of a data set; identifying quasi-identifiers for the data set; defining reidentification sensitivity of all or any targeted subset of the individual variables and quasi-identifiers; defining missing data handling rules for the individual variables; defining allowed data transformations including generalization and use of synthesized data; optimizing quasi-identifier selection, use of synthesized data and a choice of data transformations to minimize information loss and maximize privacy metrics based on the data set; the allowed data transformations; and the missing data handling rules; training the machine learning model using the data set according to the
(Continued)

defined data types; the optimized quasi-identifier selection; the optimized use of synthesized data; and the choice of data transformations; and anonymizing the data set using the training of the machine learning model.

14 Claims, 2 Drawing Sheets

(56) References Cited

U.S. PATENT DOCUMENTS

| | | | |
|---|---|---|---|
| 2018/0012039 A1 | 1/2018 | Takahashi et al. | |
| 2018/0018590 A1 | 1/2018 | Szeto et al. | |
| 2018/0165475 A1 | 6/2018 | Veeramachaneni et al. | |
| 2018/0330105 A1* | 11/2018 | Nishitani | G06F 1/187 |
| 2018/0336368 A1 | 11/2018 | Margalit et al. | |
| 2019/0095801 A1* | 3/2019 | Saillet | G06N 5/04 |
| 2019/0130129 A1 | 5/2019 | Huang | |
| 2019/0130130 A1* | 5/2019 | Huang | G16H 10/60 |
| 2020/0082290 A1* | 3/2020 | Pascale | G06N 20/00 |
| 2020/0089650 A1* | 3/2020 | Sharma | G06N 20/00 |
| 2020/0184106 A1* | 6/2020 | Santana de Oliveira | G06F 21/6254 |
| 2021/0150269 A1* | 5/2021 | Choudhury | G06V 30/1985 |

FOREIGN PATENT DOCUMENTS

| | | |
|---|---|---|
| WO | 2017187207 A1 | 11/2017 |
| WO | 2018201009 A1 | 11/2018 |

OTHER PUBLICATIONS

R. J. Bayardo and Rakesh Agrawal, "Data privacy through optimal k-anonymization," 21st International Conference on Data Engineering (ICDE'05), Tokyo, Japan, 2005, pp. 217-228, doi: 10.1109/ICDE.2005.42. (Year: 2005).*

Szarvas G, Farkas R, Busa-Fekete R. State-of-the-art anonymization of medical records using an iterative machine learning framework. Journal of the American Medical Informatics Association. Sep. 1, 2007;14(5):574-80. (Year: 2007).*

Finnish Patent and Registration Office, Search Report, U.S. Appl. No. 20/195,426, dated Jan. 10, 2020, 1 page.

International Search Report and Written Opinion of the International Searching Authority, Finnish Patent and Registration Office Application No. PCT/FI2020/050342, dated Oct. 9, 2020, 6 pages.

Written Opinion of the Searching Authority, Finnish Patent and Trademark Office, Application No. PCT/FI2020/050342, dated Oct. 9, 2020, 9 pages.

European Patent Office, Extended European Search Report, Application No. 20809852.5, dated May 17, 2023, 9 pages.

* cited by examiner

COMPATIBLE ANONYMIZATION OF DATA SETS OF DIFFERENT SOURCES

TECHNICAL FIELD

The aspects of the disclosed embodiments generally relate to compatible anonymization of data sets of different sources.

BACKGROUND

This section illustrates useful background information without admission of any technique described herein representative of the state of the art.

Creating large data sets for artificial intelligence or machine learning applications often requires combining data sets from multiple data sources within or between organizations. When the data is not public and especially when the data is sensitive, e.g., personal or the data contains commercially sensitive data, access to different data sets may be particularly restricted.

The development of artificial intelligence or a machine learning model also requires source data that is sufficiently anonymized to avoid the risk of the learning becoming distorted by particular irrelevant details that are not statistically relevant but would easily be identified by a machine learning process. It is thus necessary for technical applications of machine learning to appropriately anonymize data sets. Moreover, when there are numerous data sets from different sources, the combining of the data sets is difficult to arrange so that the sensitive data is kept away while the structure of each data set is yet maintained statistically representative and correct.

Several methods exist for protecting sensitive data and personal information by anonymizing the data and by replacing identifiers with pseudonyms or by using synthetic data instead of actual data. However, these methods would scale poorly if the data were continuously accumulating or arriving from several different organizations when the sensitive raw data cannot be shared. Also, current anonymization methods cannot guarantee compatibility of the datasets if the anonymization is performed prior to combining data from different sources.

The aspects of the disclosed embodiments are generally directed to solving or mitigating the problems related to prior art and/or to provide new technical alternative(s).

SUMMARY

According to a first example aspect of the disclosed embodiments there is provided a method for creating compatible anonymized data sets, automatically performing with machine learning equipment that operates a machine learning model:
  defining data types of individual variables of a first data set;
  identifying quasi-identifiers for the first data set;
  defining reidentification sensitivity of all or any targeted subset of the individual variables and quasi-identifiers;
  defining missing data handling rules for the individual variables;
  defining allowed data transformations including generalization and use of synthesized data;
  optimizing quasi-identifier selection, use of synthesized data and a choice of data transformations to minimize information loss and maximize privacy metrics based on at least all of:
    the first data set;
    the allowed data transformations;
    the missing data handling rules;
  the method further comprising training the machine learning model using: the first data set according to the defined data types; the optimized quasi-identifier selection;
    the optimized use of synthesized data; and the choice of data transformations; and anonymizing the first data set using the training of the machine learning model.

In an embodiment, the method uses one or more further data sets in conjunction with the first data set in the acts defined for the first data set. Advantageously, a plurality of data sets may be used in training the machine learning model.

The defining of the data types of the individual variables of the first data set may be based on a dictionary formed by the machined learning.

The machine learning model may refer to a state of the machine learning equipment in which the machine learning equipment has learned associations of different items.

The defining of the missing data handling rules for the individual variables may comprise defined user defined variable-specific statistical imputation strategies and/or defining combinations of quasi-identifier dependent learned rules which can be adjusted during run-time.

The first data set may comprise high-dimensional multivariate data with identifiable or sensitive information.

The first data set may comprise numeric data. The first data set may alternatively or additionally comprise textual data. The machine learning model may quantify textual data. The quantifying of textual data may comprise counting instances of each substring, or sets of allowed textual values. The quantifying may produce numeric data.

The defining of the reidentification sensitivity of all or any targeted subset of the individual variables and quasi-identifiers may comprise determining combined identification capability of the individual variables and the quasi-identifiers and also of the individual quasi-identifiers.

The training of the machine learning model using the first data set according to the defined data types may use a first portion of the first data set for the training. The method may comprise using a second portion of the first data set for validating the machine learning model. The second portion may exclude the first portion. The first portion and the second portion may collectively comprise the first data set entirely.

The anonymizing may remove or mask personal identifiers and replace identifying attributes with more general values that follow overall statistical distribution of a source data set (e.g., the first data set or the second data set).

The method may be performed by different authorized parties to anonymize data sets without sharing sensitive data to said authorized parties. The different authorized parties may be granted access to the machine learning model permanently or for a limited period of time.

The method may further comprise anonymizing a second data set using the training of the machine learning model. By anonymizing the second data set using the training of the machine learning model, the information learned with the first data set is used to anonymize other data sets so that a plurality of data sets can be deterministically and compatibly anonymized.

The privacy metrics may comprise k-anonymity of the anonymized first data set.

The anonymizing may at any one or more phases of the method comprise pseudonymizing. The anonymizing may at any one or more phases of the method be pseudonymizing.

The method may comprise using different reference architectures for the different data types.

The method may comprise configuring different levels of data protection for different types of data. The method may allow manual adjusting of data protection rules for individual attributes and/or automatic optimizing of the data protection rules for different strategies, such as anonymization or pseudonymization.

The method may be used to anonymize and pseudonymize dynamic data sources or data streams. The streaming data can be processed in different sized segments.

An overall performance of the system may be adjusted to the workload by adding more parallel or independent processing units and/or by adding virtual processing resources. The anonymization and pseudonymization steps may employ central processing. The anonymization and pseudonymization steps may employ discrete devices. The discrete devices may include devices that are producing the data.

According to a second example aspect of the disclosed embodiments there is provided a computer program comprising computer executable program code which when executed by at least one processor causes an apparatus at least to perform the method of the first example aspect.

According to a third example aspect of the disclosed embodiments there is provided a computer program product comprising a non-transitory computer readable medium having the computer program of the third example aspect stored thereon.

Any foregoing memory medium may comprise a digital data storage such as a data disc or diskette, optical storage, magnetic storage, holographic storage, opto-magnetic storage, phase-change memory, resistive random access memory, magnetic random access memory, solid-electrolyte memory, ferroelectric random access memory, organic memory or polymer memory. The memory medium may be formed into a device without other substantial functions than storing memory or it may be formed as part of a device with other functions, including but not limited to a memory of a computer, a chip set, and a sub assembly of an electronic device.

According to a fourth example aspect of the disclosed embodiments there is provided a machine learning equipment comprising:
a communication interface for receiving a first data set; and
a processing function configured to cause performing the method of the first example aspect.

Different non-binding example aspects and embodiments of the present disclosure have been illustrated in the foregoing. The embodiments in the foregoing are used merely to explain selected aspects or steps that may be utilized in implementations of the present invention. Some embodiments may be presented only with reference to certain example aspects of the present disclosure. It should be appreciated that corresponding embodiments may apply to other example aspects as well.

BRIEF DESCRIPTION OF THE FIGURES

Some example embodiments will be described with reference to the accompanying figures, in which.

DETAILED DESCRIPTION

In the following description, like reference signs denote like elements or steps.

Figure 1:
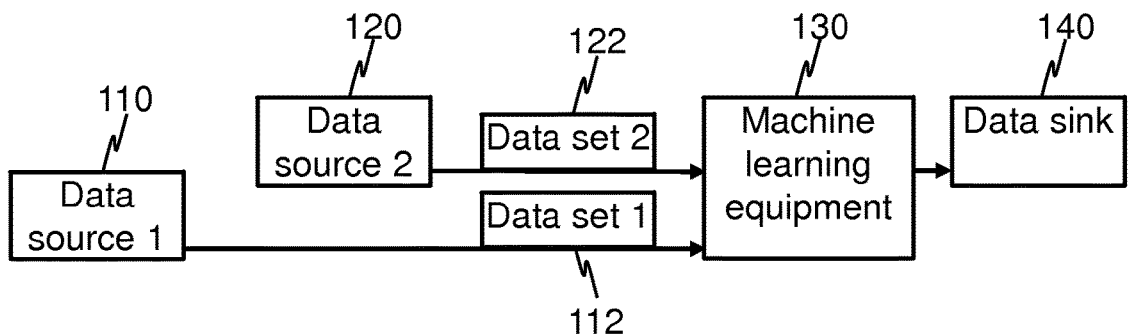
FIG. 1 shows a schematic drawing of a system according to an embodiment.

FIG. 1 shows a schematic drawing of a system 100 according to an embodiment of the invention. The system comprises a first data source 110; a second data source 120; machine learning equipment 130; and a data sink 140 to which anonymized data is provided.

The first data source 110 provides the machine learning equipment with a first data set 112 that is optionally dynamic i.e. changing over time (new entries being added or old ones being changed or deleted).

The second data source 120 provides the machine learning equipment with a second data set 122 that is optionally dynamic i.e. changing over time (new entries being added or old ones being changed or deleted).

The machine learning equipment 130 comprises, for example any one or more of the following options:
one or more dedicated computers;
one or more virtualized computers;
one or more computer cloud implemented application and/or server instances.

The machine learning equipment 130 may be auto-scaling.

The data sink 140 is or the data sink 140 comprises, for example, any one or more of: a local or remote storage; a database; a server; an artificial intelligence application. For example, the anonymization may be performed for producing data for teaching a machine learning model in which case the machine learning application may be the data sink that receives the output of the anonymization process.

Figure 2:
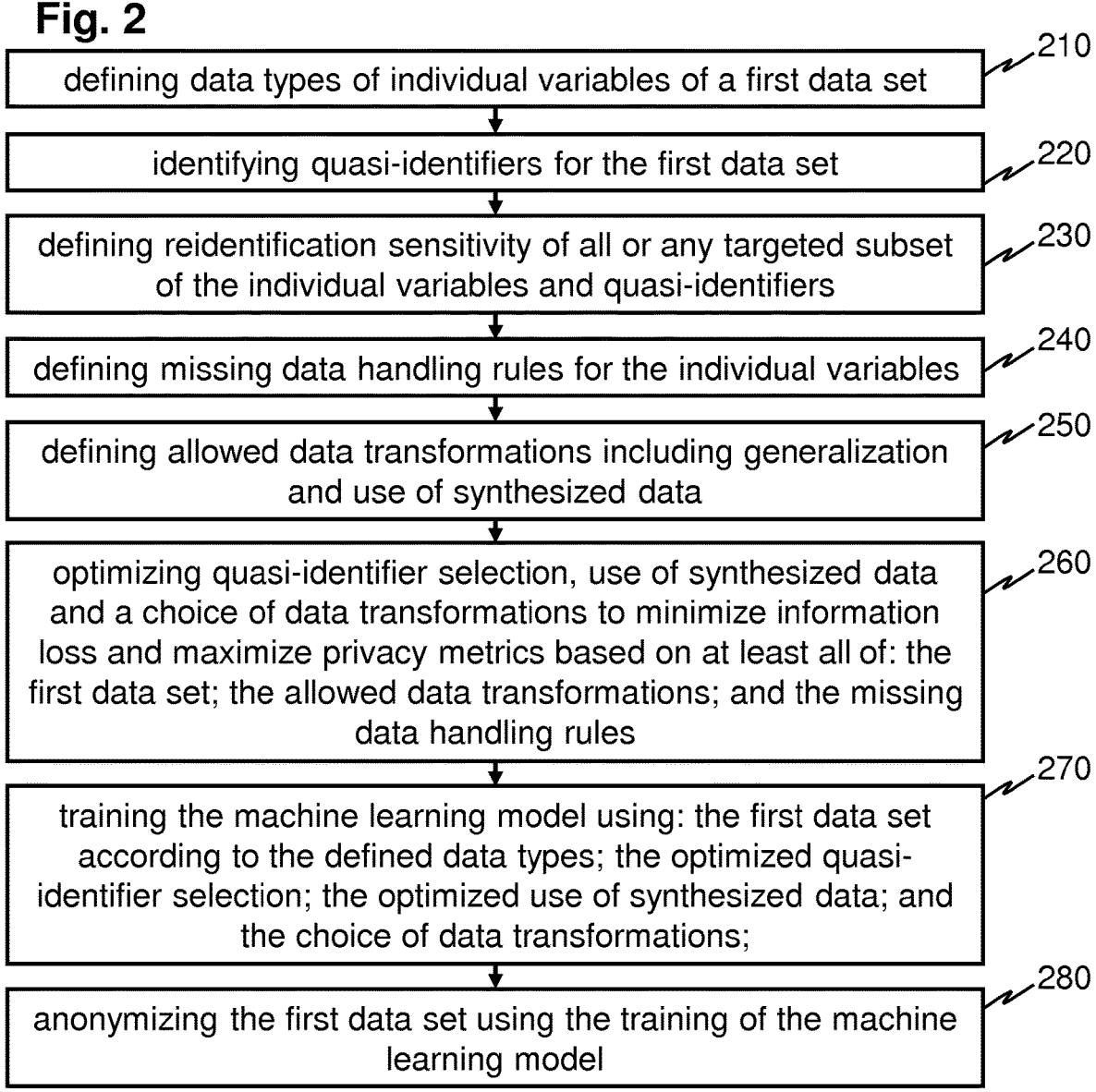
FIG. 2 shows a flow chart of a method according to an embodiment.

FIG. 2 shows a flow chart of a method according to a first example aspect for creating compatible anonymized data sets. The method comprises automatically performing with machine learning equipment:
210. defining data types of individual variables of a first data set;
220. identifying quasi-identifiers for the first data set;
230. defining reidentification sensitivity of all or any targeted subset of the individual variables and quasi-identifiers;
240. defining missing data handling rules for the individual variables;
250. defining allowed data transformations including generalization and use of synthesized data;
260. optimizing quasi-identifier selection, use of synthesized data and a choice of data transformations to minimize information loss and maximize privacy metrics based on at least all of:
the first data set 112;
the allowed data transformations; and
the missing data handling rules;
270. training the machine learning model using: the first data set according to the defined data types; the optimized quasi-identifier selection; the optimized use of synthesized data; and the choice of data transformations; and
280. anonymizing the first data set using the training of the machine learning model.

In an embodiment, the method uses one or more further data sets in conjunction with the first data set in the acts defined for the first data set. In an embodiment, this applies to steps 210 to 280. In another embodiment, this further applies to one or more further embodiments.

It should be appreciated that unless otherwise stated, the order of steps may also be changed in the method shown in FIG. 2 as well as in any other process or sub-process disclosed in this document. Moreover, the steps need not be taken one by one, but some steps may be performed in parallel and/or in pieces.

In an embodiment, the defining 210 of the data types of the individual variables of the first data set is based on a dictionary formed by the machined learning. The dictionary may enable the machine learning model to adapt to new data sets ever better (with better degree of anonymity and/or preservation of data).

In an embodiment, the defining of the missing data handling rules for the individual variables comprises defined user defined variable-specific statistical imputation strategies and/or defining combinations of quasi-identifier dependent learned rules. These strategies and/or rules can be adjusted during run-time.

In an embodiment, the first data set comprises high-dimensional multivariate data with identifiable or sensitive information. For instance, the first data set may comprise health data provided by one or various different health service providers. The first data set may comprise personal data stored by governmental agencies.

In an embodiment, the first data set comprises numeric data. In an embodiment, the first data set alternatively or additionally comprises textual data. In an embodiment, the machine learning model quantifies textual data. In an embodiment, the quantifying produces numeric data.

In an embodiment, the defining of the reidentification sensitivity of all or any targeted subset of the individual variables and quasi-identifiers comprises determining combined identification capability of the individual variables and the quasi-identifiers and also of the individual quasi-identifiers. The defining of reidentification sensitivity of various items and combinations of items may be configured to identify potential risks of allowing identifying persons or other sensitive individuals despite anonymization.

In an embodiment, the training of the machine learning model using the first data set according to the defined data types uses a first portion of the first data set for the training. In an embodiment, the method comprises using a second portion of the first data set for validating the machine learning model. In an embodiment, the second portion excludes the first portion. In an embodiment, the first portion and the second portion collectively comprise the first data set entirely.

In an embodiment, the anonymizing removes or masks personal identifiers and replaces identifying attributes with more general values that follow overall statistical distribution of a source data set (e.g., the first data set or the first and second data sets).

In an embodiment, the method is performed by different authorized parties to anonymize data sets without sharing sensitive data to said authorized parties. In an embodiment, the different authorized parties are granted access to use the machine learning model permanently or for a limited period of time. The use of the machine learning model may effectively enable using a plurality of different sources of sensitive data without exposing the sensitive data to other parties. By using the machine learning, the anonymization may be performed with optimized preservation of data and protecting of sensitive information.

The machine learning model may use a neural network that learns and anonymizes each new piece of data against a neural network model rather than against a whole data set. This may avoid repeated solving of computationally demanding problems for which there is no known polynomial algorithm, so that the time to find a solution grows exponentially with problem size The machine learning may also hide the sensitive information so as to expose only a machine learning model and/or synthetic data. In an embodiment, an output of the anonymization comprises or consists of the synthetic data. The anonymization may be performed in many cases already before pooling or combining data sets while maintaining quality of anonymization i.e. compatible anonymization of the different data sources.

In an embodiment, the method further comprises anonymizing a second data set using the training of the machine learning model. By anonymizing the second data set using the training of the machine learning model, the information learned with the first data set is used to anonymize other data sets so that a plurality of data sets can be deterministically and compatibly anonymized.

The second data set may be anonymized with different data retention such that the information loss and privacy metrics are optimized based on the data of the second data set to avoid the risks of re-identification and excessive loss of information.

The use of the machine learning model may be automated and computer implemented such that no human being gets the sensitive information of different data sources. This may further help protecting the sensitive information.

The privacy metrics comprise k-anonymity of the anonymized first data set.

In an embodiment, the anonymizing at any one or more phases of the method comprises pseudonymizing. In an embodiment, the anonymizing of any one or more phases of the method is pseudonymizing.

In an embodiment, the method comprises using different reference architectures for the different data types.

In an embodiment, the method comprises configuring different levels of data protection for different types of data. In an embodiment, the method allows manual adjusting of data protection rules for individual attributes and/or automatic optimizing of the data protection rules for different strategies, such as anonymization or pseudonymization.

In an embodiment, the method is used to anonymize and pseudonymize dynamic data sources or data streams. The streaming data can be processed in different sized segments.

In an embodiment, an overall performance of the system is adjusted to the workload by adding more parallel or independent processing units and/or by adding virtual processing resources. In an embodiment, the anonymization and pseudonymization steps employ central processing. In an embodiment, the anonymization and pseudonymization steps employ discrete devices. In an embodiment, the discrete devices include devices that are producing the data.

Figure 3:
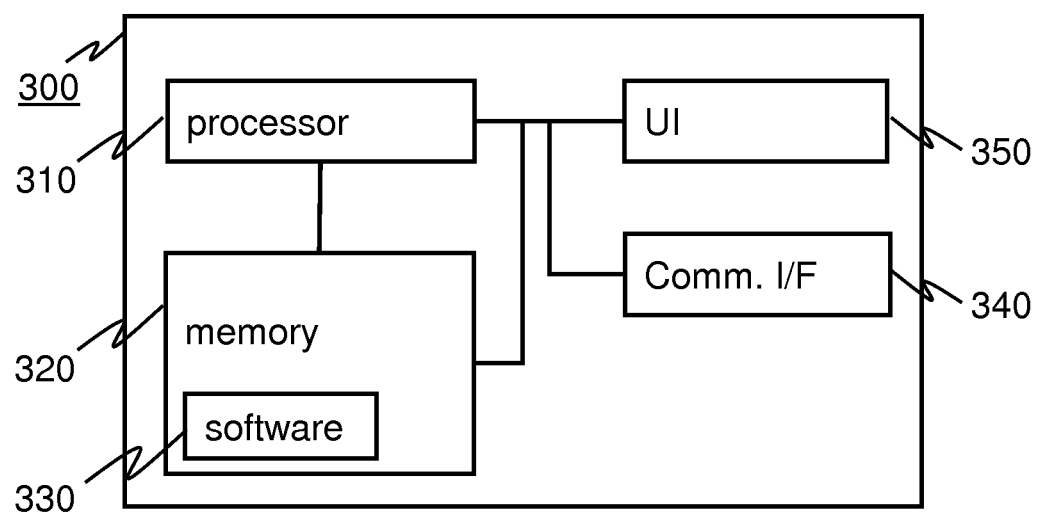
FIG. 3 presents an example block diagram of an apparatus in which various embodiments or aspects of the present disclosure may be applied.

FIG. 3 presents an example block diagram of an apparatus 300 in which various embodiments of the invention may be applied. This may be a user device or apparatus, such as a mobile terminal or other communication device.

The general structure of the apparatus 300 comprises a communication interface module 340, a processor 310 coupled to the communication interface module 340, and a memory 320 coupled to the processor 310. The apparatus further comprises software 330 stored in the memory 320 and operable to be loaded into and executed in the processor 310. The software 330 may comprise one or more software modules and can be in the form of a computer program product. The apparatus 300 further comprises a user interface controller 350 coupled to the processor 310.

The processor 310 may be, e.g., a central processing unit (CPU), a microprocessor, a digital signal processor (DSP), a graphics processing unit, an application specific integrated circuit (ASIC), a field programmable gate array, a microcontroller, a neural network processor or a combination of such elements. FIG. 3 shows one processor 310, but the apparatus 300 may comprise a plurality of processors.

The memory 320 may be for example a volatile or a non-volatile memory, such as a read-only memory (ROM), a programmable read-only memory (PROM), erasable programmable read-only memory (EPROM), a random-access memory (RAM), a flash memory, a data disk, an optical storage, a magnetic storage, a smart card, or the like. The apparatus 300 may comprise a plurality of memories. The memory 320 may be constructed as a part of the apparatus 300 or it may be inserted into a slot, port, or the like of the apparatus 300 by a user. The memory 320 may serve the sole purpose of storing data, or it may be constructed as a part of an apparatus serving other purposes, such as processing data.

The user interface controller 350 may comprise circuitry for receiving input from a user of the apparatus 300, e.g., via a keyboard, graphical user interface shown on the display of the apparatus 300, speech recognition circuitry, or an accessory device, such as a headset, and for providing output to the user via, e.g., a graphical user interface or a loudspeaker.

A skilled person appreciates that in addition to the elements shown in FIG. 3, the apparatus 300 may comprise other elements.

Various embodiments have been presented. It should be appreciated that in this document, words comprise, include and contain are each used as open-ended expressions with no intended exclusivity.

The foregoing description has provided by way of non-limiting examples of particular implementations and embodiments of the present disclosure a full and informative description of the best mode presently contemplated by the inventors for carrying out the aspects of the disclosed embodiments. It is however clear to a person skilled in the art that the present disclosure is not restricted to details of the embodiments presented in the foregoing, but that it can be implemented in other embodiments using equivalent means or in different combinations of embodiments without deviating from the characteristics of the present disclosure.

Furthermore, some of the features of the afore-disclosed embodiments of this present disclosure may be used to advantage without the corresponding use of other features. As such, the foregoing description shall be considered as merely illustrative of the principles of the present disclosure, and not in limitation thereof. Hence, the scope of the aspects of the disclosed embodiments is only restricted by the appended patent claims.

The invention claimed is:

1. A method for creating compatible anonymized data sets, automatically performing with machine learning equipment that operates a machine learning model, the method comprising:
    defining data types of individual variables of a first data set;
    identifying quasi-identifiers for the first data set;
    defining reidentification sensitivity of all or any targeted subset of the individual variables and quasi-identifiers;
    defining missing data handling rules for the individual variables;
    defining allowed data transformations including generalization and use of synthesized data;
    optimizing quasi-identifier selection, use of synthesized data and a choice of data transformations to minimize information loss and maximize privacy metrics based on at least all of:
        the first data set;
        the allowed data transformations; and
        the missing data handling rules;
    the method further comprising:
        training the machine learning model using: the first data set according to the defined data types; the optimized quasi-identifier selection; the optimized use of synthesized data; and the choice of data transformations;
        and anonymizing the first data set using the trained machine learning model.

2. The method of claim 1, wherein the method uses one or more further data sets in conjunction with the first data set in the acts defined for the first data set.

3. The method of claim 1, wherein the defining of the missing data handling rules for the individual variables comprises user defined variable-specific statistical imputation strategies.

4. The method of claim 1, wherein the defining of the missing data handling rules for the individual variables comprises defining combinations of quasi-identifier dependent learned rules which can be adjusted during run-time.

5. The method of claim 1, wherein the defining of the reidentification sensitivity of all or any targeted subset of the individual variables and quasi-identifiers comprises determining combined identification capability of the individual variables and the quasi-identifiers and also of the individual quasi-identifiers.

6. The method of claim 1, wherein the training of the machine learning model using the first data set according to the defined data types uses a first portion of the first data set for the training.

7. The method of claim 6, further comprising using a second portion of the first data set for validating the machine learning model.

8. The method of claim 1, further comprising anonymizing a second data set using the trained machine learning model.

9. The method of claim 1, further comprising using different reference architectures for the different data types.

10. The method of claim 1, further comprising configuring different levels of data protection for different types of data.

11. The method of claim 1, wherein the first data set is a dynamic data set.

12. The method of claim 1, wherein an overall performance of the system is adjusted to the workload by adding more parallel or independent processing units and/or by adding virtual processing resources.

13. A non-transitory computer program product comprising computer executable program code which when executed by at least one processor causes an apparatus at least to perform the method of claim 1.

14. A computing apparatus comprising at least one processor configured to execute machine readable instructions stored on a non-transitory computer readable medium, wherein execution of the machine readable instructions by the processor is configured to cause the computing apparatus to
perform the method of claim 1.

* * * * *